Aug. 10, 1926.

L. A. FEUCHTER 1,595,826

HEADLIGHT DIMMER

Filed Jan. 21, 1925

Inventor
L. A. Feuchter.
By
Attorney

Patented Aug. 10, 1926.

1,595,826

UNITED STATES PATENT OFFICE.

LEO A. FEUCHTER, OF IRONTON, OHIO.

HEADLIGHT DIMMER.

Application filed January 21, 1925. Serial No. 3,815.

This invention relates to a dimmer or shield for use in connection with the headlights of automobiles in order to dim or control the headlights at desired times to avoid "blinding" of pedestrians and drivers of adjacent automobiles.

It is generally aimed to provide a novel construction of shield or dimmer and especially a novel means of connection between the dimmers and the control rod thereof to the end that the shield may be placed readily in adjusted positions and held therein by friction.

Another object is to provide a novel construction wherein the control rod is sectional to adapt the shield to automobiles of different types and wherein the control lever as applied to said rod is adjustable thereon.

Additional objects and advantages will become apparent from a consideration of the description following taken in connection with accompanying drawings illustrating an operative embodiment.

In said drawings:—

Figure 1:
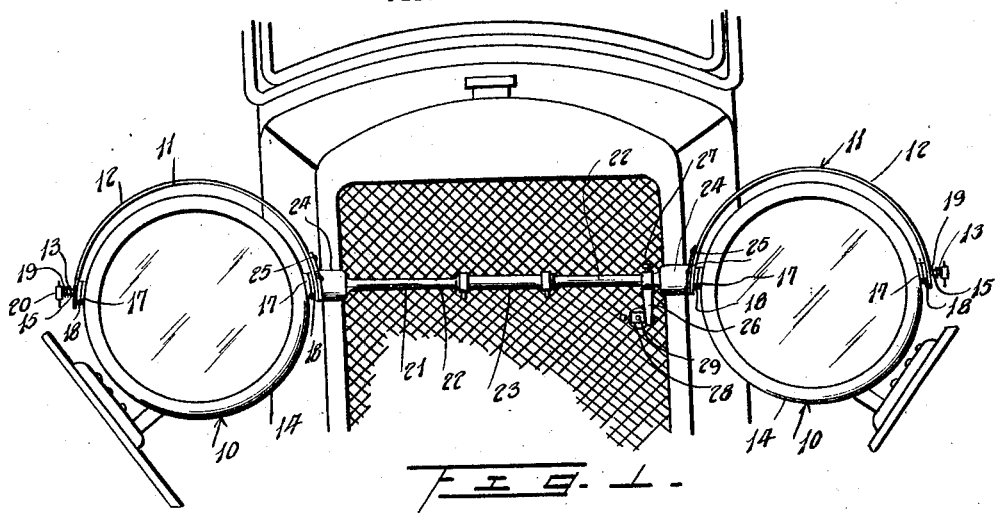
Figure 1 is a view of the device in front elevation.
Figures 2, 3:
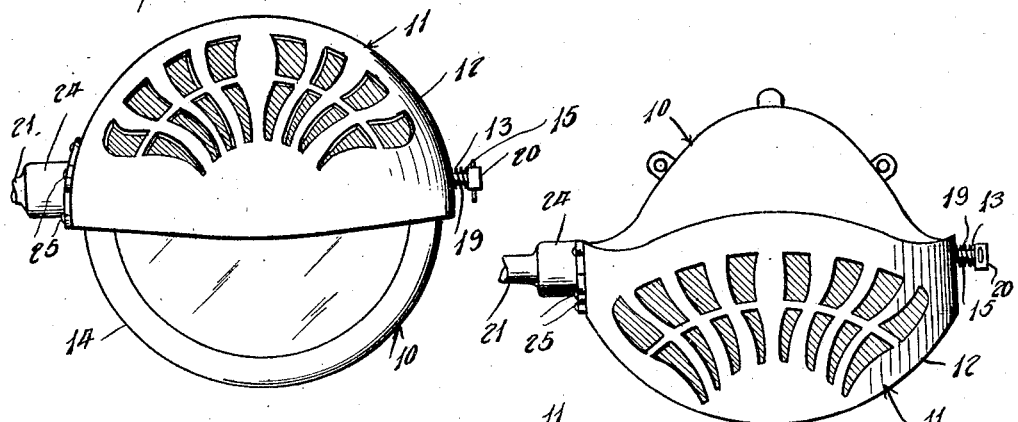
Figure 2 is a fragmentary front elevation showing one of the dimmers in applied position.
Figure 3 is a plan view.
Figure 4:
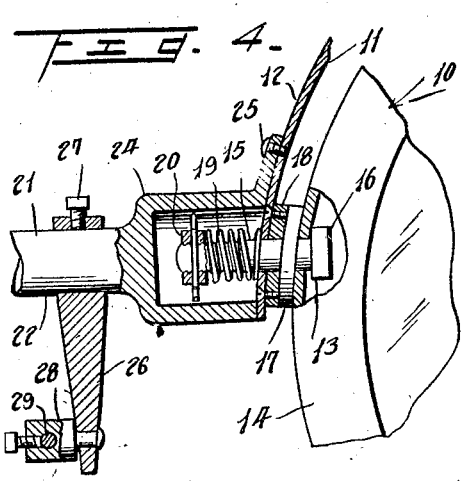
Figure 4 is a cross sectional view taken on the line 4—4 of Figure 1 to particularly illustrate the friction connection.
Figure 5:
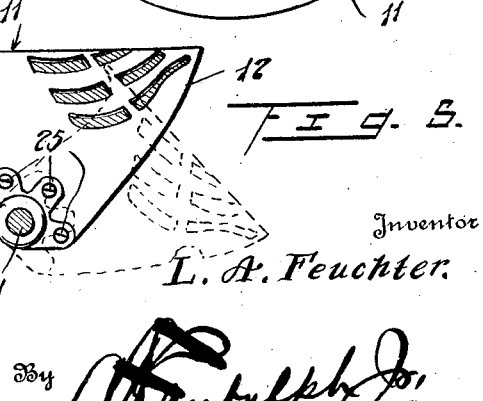
Figure 5 is an end view of one of the visors showing the operating shaft in section.

Referring specifically to the drawings, the headlights of an automobile or the like are shown as at 10. Each headlight has a shield or visor 11 associated therewith normally occupying a position out of use as shown in Figure 1 but being adapted for movement to the position dimming the headlight as suggested in Figure 2. These shields or visors may be of any appropriate construction of suitable material but preferably have plates or bodies 12 of arcuate form, having a suitable design as shown cut therethrough and covered for instance by a sheet of celluloid applied and fastened to the under side of the visor or shield. The celluloid preferably is colored green and the rays of light will pass through the openings of the design of the shield and the celluloid.

Each shield is pivotally mounted at opposite ends as at 13, and from the removable rims 14 which secure the lenses of the headlights 10 in place. Suitable openings are drilled at two points of each rim in horizontal alinement, and through the same bolts 15 have their shanks passed, being retained in such position by heads 16 when the rim 14 is in place, it being understood that the proportion of the parts is such that the heads 16 are accommodated. A metallic washer 17 is applied to each bolt and engages the outer surface of rim 14. Washers 18 are carried by the shield 11, being rigid therewith and pass over the shanks of the bolts 15 and engage the washers 17. Expansive springs 19 are disposed about the bolts 15 and engage the washers 18 and nuts 20 threaded on said bolts. As a result of this construction, the washers 18 are urged to and maintained in frictional engagement with the washers 17 and hence the shield 11 will remain in any position to which it is adjusted by friction.

A control rod as at 21 spans the shields. This control rod is made up of sections 22 adjustably connected together by a sleeve coupling 23. At the outer ends, sections 22 have housings 24 of crow-foot formation which are disposed over the adjacent bolts 15 and fastened by bolts or the like 25 to the shields.

The control rod 22 is adapted to be manipulated in any desired way and to this end has a lever 26 adjustable along one of the sections 22 and adapted to be fastened in adjusted position by a screw or the like 27. This rod carries a swivel coupling as at 28 of any desired form, to which an operating wire 29 or the like may be fastened. Wire 29 preferably passes through the core of the automobile radiator, guided in any suitable manner, and manipulated from the dash board of the automobile, the latter features not being shown as they constitute no part of the present invention.

With the device installed on an automobile, the visors or shields 11 normally occupy the position shown in Figure 1. When the vehicle equipped with my improvement is passing another or for any other reason, the headlights should be dimmed, the wire 29 is operated so as to shift lever 26, rod 22 and the shields or visors 11, moving the latter to any appropriate position by dimming the headlights 10 to any desired extent, some of the lights penetrating the hood through the visor and the openings formed by the design therein. The parts remain in adjusted position merely by friction.

Attention is also called to the fact that the device does not need the services of a mechanic for installation since any one can drill or provide the holes in the rims 14 for the bolts 15 and can connect the remaining parts as described.

Various changes may be resorted to provided they fall within the spirit and scope of the invention.

What is claimed is:—

In combination with a rim of a headlight or the like, bolts passing outwardly through said rim and retained by the rim, washers on said bolts in frictional engagement with each other, a visor pivotally mounted on said bolts and carrying one of said washers at each side thereof, springs to maintain said washers in frictional engagement abutting the visor whereby the visor will remain in positions to which it is adjusted, nuts on said bolts serving as abutments for said springs, and a control rod for the visor having a hollow housing attached to the visor and covering the adjacent bolt and associated parts.

In testimony whereof I affix my signature.

LEO A. FEUCHTER.